(12) United States Patent
Chaplik et al.

(10) Patent No.: US 9,135,051 B2
(45) Date of Patent: Sep. 15, 2015

(54) REDIRECTING GUEST-GENERATED EVENTS TO AN EVENT AGGREGATOR IN A NETWORKED VIRTUALIZATION ENVIRONMENT

(71) Applicant: Red Hat Israel, Ltd., Raanana (IL)

(72) Inventors: Gilad Chaplik, Ramat Gan (IL); Haim Ateya, Givatayim (IL)

(73) Assignee: Red Hat Israel, Ltd., Raanana (IL)

( * ) Notice: Subject to any disclaimer, the term of this patent is extended or adjusted under 35 U.S.C. 154(b) by 365 days.

(21) Appl. No.: 13/667,094

(22) Filed: Nov. 2, 2012

(65) Prior Publication Data

US 2014/0130039 A1 May 8, 2014

(51) Int. Cl.
 G06F 9/455 (2006.01)
 H04L 12/24 (2006.01)
 G06F 9/54 (2006.01)
 G06F 11/00 (2006.01)

(52) U.S. Cl.
 CPC .......... *G06F 9/45558* (2013.01); *G06F 9/54* (2013.01); *G06F 11/00* (2013.01); *G06F 2009/45595* (2013.01); *G06F 2201/00* (2013.01); *H04L 41/0213* (2013.01)

(58) Field of Classification Search
 None
 See application file for complete search history.

(56) References Cited

U.S. PATENT DOCUMENTS

| | | | | |
|---|---|---|---|---|
| 5,237,684 A * | 8/1993 | Record et al. | | 719/318 |
| 6,170,005 B1 * | 1/2001 | Meandzija | | 709/217 |
| 6,363,421 B2 * | 3/2002 | Barker et al. | | 709/224 |
| 6,404,743 B1 * | 6/2002 | Meandzija | | 370/254 |
| 6,564,171 B1 * | 5/2003 | Peterson et al. | | 702/182 |
| 6,633,909 B1 * | 10/2003 | Barrett et al. | | 709/224 |
| 7,213,068 B1 * | 5/2007 | Kohli et a | | 709/225 |
| 8,738,972 B1 * | 5/2014 | Bakman et al. | | 714/47.2 |
| 2001/0052006 A1 * | 12/2001 | Barker et al. | | 709/223 |
| 2005/0144269 A1 * | 6/2005 | Banatwala et al. | | 709/223 |
| 2005/0165834 A1 * | 7/2005 | Nadeau et al. | | 707/103 R |
| 2006/0161652 A1 * | 7/2006 | Takizawa et al. | | 709/224 |
| 2007/0226755 A1 * | 9/2007 | Kilian-Kehr | | 719/318 |
| 2008/0034415 A1 * | 2/2008 | Chacko et al. | | 726/14 |
| 2008/0133644 A1 * | 6/2008 | Garcia-Martin et al. | | 709/202 |
| 2009/0055532 A1 * | 2/2009 | Oh et al. | | 709/225 |
| 2010/0107162 A1 * | 4/2010 | Edwards et al. | | 718/1 |
| 2011/0194563 A1 * | 8/2011 | Shen et al. | | 370/395.52 |
| 2011/0255538 A1 * | 10/2011 | Srinivasan et al. | | 370/392 |
| 2012/0210318 A1 * | 8/2012 | Sanghvi et al. | | 718/1 |
| 2012/0216273 A1 * | 8/2012 | Rolette et al. | | 726/13 |
| 2012/0317566 A1 * | 12/2012 | Santos et al. | | 718/1 |
| 2012/0331461 A1 * | 12/2012 | Fries et al. | | 718/1 |
| 2013/0074066 A1 * | 3/2013 | Sanzgiri et al. | | 718/1 |
| 2014/0115578 A1 * | 4/2014 | Cooper et al. | | 718/1 |

* cited by examiner

*Primary Examiner* — Emerson Puente
*Assistant Examiner* — Benjamin Wu
(74) *Attorney, Agent, or Firm* — Lowenstein Sandler LLP

(57) ABSTRACT

A method for integrating responses to asynchronous events is provided. A hypervisor of a host receives a request from a network manager to re-direct asynchronous events from a guest to an address of an event aggregation manager distinct from an address of the network manager. The hypervisor receives an asynchronous event having a destination address of the network manager from the guest. The hypervisor maps the destination address of the network manager to the address of the event aggregation manager. The hypervisor transmits the asynchronous event to the event aggregation manager.

19 Claims, 8 Drawing Sheets

US 9,135,051 B2

REDIRECTING GUEST-GENERATED EVENTS TO AN EVENT AGGREGATOR IN A NETWORKED VIRTUALIZATION ENVIRONMENT

TECHNICAL FIELD

Embodiments of the present disclosure relate to a computer system, and more specifically, to a method and system for integrating SNMP/WMI responses to events originating from virtual machines.

BACKGROUND

The Simple Network Management Protocol (SNMP) has achieved widespread acceptance for managing computer-based devices and systems connected by a network (e.g., the Internet). SNMP is a network management standard that defines a strategy for managing TCP/IP and Internet Packet Exchange (IPX) networks. A conventional distributed SNMP architecture may include multiple managed nodes (e.g., a host or a virtual machine), each with an SNMP entity called an agent which provides remote access to management instrumentation. A conventional SNMP architecture further includes at least one SNMP entity referred to as a manager which runs management applications to monitor and control the managed nodes/elements. Managed elements are devices such as hosts, routers, virtual machines, etc. They are monitored and controlled by accessing their management information. A management protocol, SNMP, is used to convey management information between the managers and agents. Management information refers to a collection of managed objects that reside in a virtual information store called a Management Information Base (MIB). Collections of related managed objects are defined in specific MIB modules. The MIB contains the information requested by the management system. The MIB for a networked computer may include, for example, information on the configuration and performance of the network interface card, the available hard drive space, the version of drivers and applications, and so on. Additional MIBs may be written and loaded, to expose the data that is specified for collection, as long as the system itself supports the collection of the requested information.

Each SNMP element manages specific objects with each object having specific characteristics. A managed object is a characteristic of something that can be managed. For example, a list of currently active TCP circuits in a particular host computer is a managed object. Managed objects differ from variables, which are particular object instances. An object instance may be, for example, a single active TCP circuit in a particular host computer. Managed objects can be scalar (defining a single object instance) or tabular (defining multiple, related instances).

SNMP employs five basic messages (GET, GET-NEXT, GET-RESPONSE, SET, and TRAP) to communicate between an SNMP manager and an SNMP agent. The GET and GET-NEXT messages permit the SNMP manager to request information for a specific variable from the SNMP agent. The SNMP agent, upon receiving a GET or GET-NEXT message, may issue a GET-RESPONSE message to the SNMP manager with either the information requested or an error indication as to why the request cannot be processed. A SET message permits the SNMP manager to request that a change be made to the value of a specific variable. The SNMP agent may then respond with a GET-RESPONSE message indicating the change has been made or an error indication as to why the change cannot be made.

The SNMP TRAP message permits the SNMP agent to spontaneously inform the SNMP manager of an event. An SNMP trap is an unsolicited (asynchronous) message that an agent sends to a SNMP management system when it detects a certain type of event has occurred locally on the managed host. Events may include alarms, a change of configuration, such as an addition of a new host, a user defined threshold crossing, such as exceeding a specified amount of virtual memory usage in a virtual machine, and so on.

A corresponding network management protocol in the Windows world is known as Windows Management Instrumentation (WMI). WMI is a set of specifications from Microsoft for consolidating the management of devices and applications in a network from Windows computing systems. WMI also includes a type of asynchronous notification message called a WMI trap, which has a format and structure that is similar to and maps directly to SNMP traps.

Trap-directed notification is employed in SNMP or WMI to reduce notification traffic congestion. If the SNMP manager is responsible for a large number of physical element(s), and each physical element has a large number of objects, it is impractical for the SNMP or WMI manager to poll or request information from every object of every physical element. The solution is for each SNMP agent on the managed physical element to notify the SNMP manager without solicitation. It does this by sending an SNMP trap message. After the SNMP manager receives the SNMP trap message, the SNMP manager transmits the SNMP trap message to the human network manager for display and may choose to take an action based on the fields included in the SNMP trap message. For instance, the SNMP manager may poll the SNMP agent directly, or poll other associated device agents to obtain a better understanding of the event.

Trap-directed notification may result in substantial savings of network and agent resources by eliminating the need for frivolous SNMP requests. However, it is not possible to totally eliminate SNMP polling. SNMP requests are required for discovery and topology changes. In addition, a managed device agent can not send a trap if the device has had a catastrophic outage. Moreover, when an SNMP element includes a plurality of virtual machines, each with its own virtual agent and virtual MIB, a notification traffic congestion problem may occur. A distributed managed network may include a large number of virtual machines per host with each virtual machine generating traps as well as the host. As a result, the SNMP manager(s) as well as the network may be overwhelmed with SNMP or WMI trap traffic, potentially slowing or halting the SNMP manager(s) and the network.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
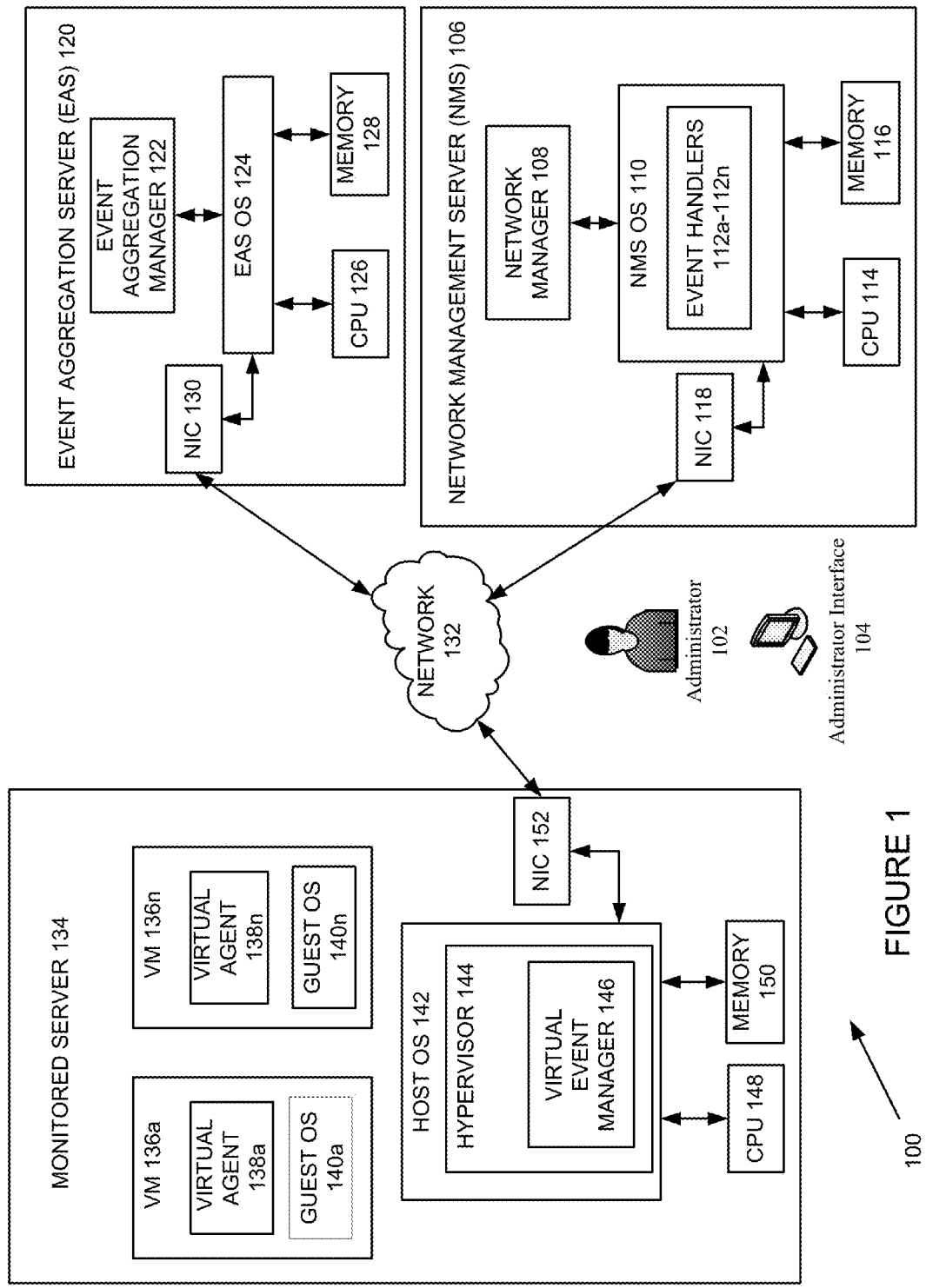
FIG. 1 is a block diagram of a network architecture in which embodiments of the present disclosure may operate.

Methods and systems for integrating responses to asynchronous events are described herein. A network may include a network management server (NMS), an event aggregation server (EAS), one or more monitored servers, and a network. In one embodiment, a hypervisor of a host receives a request from a network manager to re-direct asynchronous events from a guest to an address of an event aggregation manager distinct from an address of the network manager. The hypervisor receives an asynchronous event having a destination address of the network manager from the guest. The hypervisor maps the destination address of the network manager to the address of the event aggregation manager. The hypervisor transmits the asynchronous event to the event aggregation manager. The asynchronous event may be an SNMP trap or a WMI trap. The address of the event aggregation manager may correspond to an ID, a URL, an IP address, or a MAC address.

In another embodiment for integrating responses to asynchronous events, a network manager may transmit a command to a hypervisor of a host to cause the hypervisor to re-direct asynchronous events generated by a guest residing on the host to an address of an event aggregation manager distinct from an address of the network manager. The asynchronous events generated by the guest have a destination address of the network manager. The hypervisor is configured to map the destination address of the network manager to the address of the event aggregation manager.

The network manager receives from the event aggregation manager an asynchronous event from the guest. The network manager invokes an event handler based on a characteristic of the asynchronous event. The event handler may be invoked on a per-event basis or on a per-combination-of-events basis. The network manager may gather information about the guest based on data associated with the received asynchronous event. In one embodiment, the network manager may register with the event aggregation manager to receive asynchronous events having the characteristic. In one embodiment, the network manager polls event aggregation manager for asynchronous events on a periodic basis or may receive asynchronous events from the event aggregation manager asynchronously.

In yet another embodiment for integrating responses to events, an event aggregation manager transmits a command to a hypervisor of a host to re-direct events generated by guest to an address of the event aggregation manager distinct from an address of a network manager. The event aggregation manager receives from the hypervisor an asynchronous event from the guest. The asynchronous events generated by the guest have a destination address of the network manager. The hypervisor is configured to map the destination address of the network manager to the address of the event aggregation manager. The event aggregation manager stores the asynchronous event. In one embodiment, the asynchronous event may be stored in at least one queue based on a characteristic of the asynchronous event. In one embodiment, the event aggregation manager forwards the asynchronous event asynchronously to the network manager or in response to a polling request from the network manager.

In one embodiment, the event aggregation manager may filter or mask the asynchronous event based on at least one characteristic of the asynchronous event. The event aggregation manager may be implemented in a server associated with the network manager or in a server distinct from a server associated with the network manager.

Embodiments of the present disclosure that offload and centralize receiving asynchronous events from a plurality of virtual machines/agents in an event aggregation manager distinct from a network manager may considerably reduce congestion and thus processing time in a network management server.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram of a network architecture 100 in which embodiments of the present disclosure may operate. The network architecture 100 may include a network management server (NMS) 106, an event aggregation server (EAS) 120, one or more monitored servers 134, and a network 132. Each of the servers 106, 120, 134 may be a computing device such as, for example, desktop computers, personal computers (PCs), server computers, mobile phones, palm-sized computing devices, personal digital assistants (PDAs), tablet devices, etc. Each of the servers 106, 120, 134 may include one or more central processing units (CPUs) 114, 126, 148, respectively, configured to store and read data and programs from a corresponding memory 116, 128, 150, respectively. In another embodiment, the EAS 120 may be integrated with the NMS 106.

The NMS 106 is configured to manage the operations (get and set managed object values, e.g., an amount of virtual memory for a specified virtual machine) of the monitored server 134 and configured to receive asynchronous events (e.g., SNMP or WMI traps) from the EAS 120 that have been re-routed from the monitored server 134 to the EAS 120. Examples of asynchronous events may include alarms, a change of configuration, such as an addition of a new host or virtual machine, a user defined threshold crossing, such as exceeding a specified amount of virtual memory usage in a virtual machine, etc. The NMS 106 may register for specific events to be received from the EAS 120. The EAS 120, in turn, may filter out non-registered for asynchronous events, thereby reducing event traffic that the NMS 106 needs to handle, improving overall NMS 106 performance.

The servers 106, 120, 134 are each communicatively coupled to the network 132. The network 132 may be a public network (e.g., the Internet) or a private network (e.g., Ethernet or a local area Network (LAN)). The servers 106, 120, 134 may exchange management messages, responses, and events with each other using a network management protocol (e.g., SNMP or WMI) over the network 132 through their respective network interface controllers (NICs) 118, 130, 152.

In one embodiment, a hypervisor 144 of a guest OS 140a residing on a monitored server 134 may be configured to receive requests from a network manager application 108 residing on an NMS operating system 110 of the NMS 106. In one embodiment, the request may be a command and configuration data for redirecting events from a virtual machine (e.g., the VM 136a) to an address (e.g., an IP address) of an event aggregation manager 122 residing on the EAS 120. The address of the event aggregation manager 122 may be distinct from an address (e.g., an IP address) of a network manager application 108 residing on the NMS 106. In another embodiment, the request for redirecting events generated by the monitored servers 134 may be received from the event aggregation manager 122 of the EAS 120 instead of from the network manager application 108 residing on the NMS 106.

A virtual agent (e.g., 138a) of a VM (e.g., 136a) is configured to monitor alarms that may be generated by virtual hardware or virtual software interrupts or virtual device parameter performance threshold crossings and map these alarms/threshold crossings into asynchronous events (e.g., SNMP or WMI traps). These SNMP or WMI traps may have a destination address of the NMS 106. In an embodiment, a virtual event manager 146 of the hypervisor 144 residing on the host 142 receives the SNMP or WMI trap from the virtual agent 138a and redirects the event/trap to the event aggregation manager 122 residing on the EAS 120. The EAS 120 may be configured to store, filter, and/or mask the event/trap by the event aggregation manager 122. The EAS 120 may transmit the stored, filtered, and/or masked event based on a characteristic of the event. Characteristics may include, for example, the type of event, instance of the event, or any other data accompanying the event. The event may be then be transmitted to the network manager 108 either asynchronously or upon request (e.g., by polling) of the network manager 108.

The network manager 108 is configured to forward a received event to an NMS operating system (OS) 110. The NMS OS 110 may, in response to receiving the event, invoke one or more event handlers 112a-112n based on the characteristic of the received event or combination of the received event and previously received events. The received event may then be displayed on an administrator interface 104 for viewing by an administrator 102.

Figure 2:
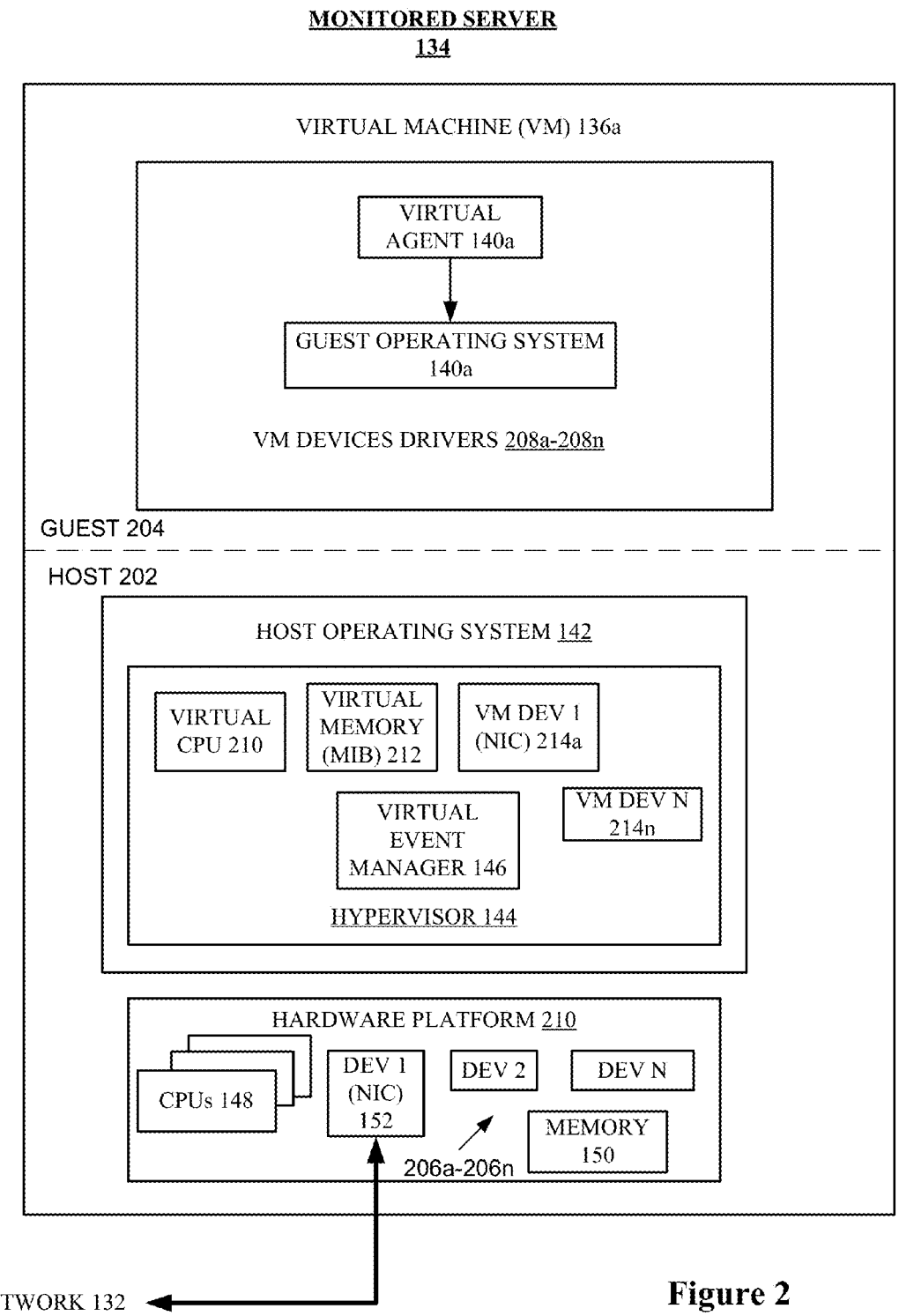
FIG. 2 is a block diagram illustrating one embodiment of the monitored server, in which embodiments of the present disclosure may be implemented.

FIG. 2 is a block diagram illustrating one embodiment of the monitored server 134, in which embodiments of the present disclosure may be implemented. The monitored server 134 may be a host machine 202 such as, for example, a server computer, a gateway computer or any other suitable computer system that is configurable for operating as a host. The host machine (also referred to as a host) 202 may comprise an operating system 142 and a hardware platform 210. The host operating system 142 may include Microsoft Windows®, Linux®, Solaris®, Mac® OS or any other suitable operating system for managing operations on the monitored server 134.

The hardware platform 210 may include one or more central processing units (CPUs) 148, devices 206a-206n (DEV 1-DEV N), and memory 150. The devices 206a-206n may be comprised of one or more hardware and software devices, which may be located internally and externally to the monitored server 134. Examples of the devices 206a-206n include network interface controllers (NICs) 152), sound or video adaptors, photo/video cameras, printer devices, keyboards, displays or any other suitable device intended to be coupled to a computer system. Examples of the memory 150 include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), etc. In one embodiment, the memory 150 may be configured to implement an SNMP or WMI management information base (MIB) (not shown). The MIB may include managed objects, such as the identities of and characteristics/performance parameters of associated host hardware and software devices (e.g., the CPU 148, the NIC 152, etc.).

The host machine 202 may be configured with one or more virtual machines (VMs) 136a-136n. A VM (e.g., 136a) is a portion of software that, when executed on appropriate hardware, creates an environment allowing the virtualization of an actual physical computer system. The VM 136a may function as a self-contained platform, comprising one or more virtual CPUs 210, virtual memory 212, and virtual devices 214a-214n (e.g., a virtual NIC 214a) running under the control of a guest operating system 140a. The guest operating systems 140a may be the same or different operating system from the host operating system 142. Similar to the host operating system 142, the guest operating system 140a may include Microsoft Windows®, Linux®, Solaris®, Mac® OS or any other suitable operating system for managing operations associated with a virtualization environment. In one embodiment, the virtual memory 212 may be configured to implement an SNMP or WMI management information base (MIB) and a virtual agent application (e.g., 140a) configured to receive events from the VM 136a. The SNMP or WMI MIB may include managed objects, such as the identities of and characteristics/performance parameters of associated virtual host hardware and software devices (e.g., a virtual CPU 210, a virtual NIC 152, virtual memory 212, etc.).

The hypervisor 144, which emulates the underlying hardware platform 210 for the VMs 136a-136n, is provided and may run on the host OS 142. A hypervisor is also known as a virtual machine monitor (VMM), a kernel-based hypervisor or a host operating system. The hypervisor 144 may support multiple VMs 136a-136n residing on the host 202. Alternatively, more than one hypervisor 144 (not shown) may be provided to support multiple VMs 136a-136n residing on the host 202. The hypervisor 144 is configured to emulate the one or more virtual CPUs 210, the virtual memory (MIB) 212, and virtual devices 214a-214n in cooperation with the virtual device drivers 208a-208n residing on a virtual machine 144.

In one embodiment, the hypervisor 144 is configured to emulate a virtual event manager 146. The virtual event manager 146 may be configured to receive a request from either the network manager 108 of the NMS 106 or the event aggregation manager 122 of the EAS 120 to re-direct events originating from a virtual agent (e.g., 138a) to the address of the event aggregation manager 122. In an example, a virtual agent (e.g., 138a) may, by default, be initially configured to transmit all of its SNMP traps over the network 132 directly to the NMS 106. The corresponding virtual event manager 146 may intercept and re-direct (i.e., replace the destination address) the trap to be transmitted instead to the address of the EAS 120. Alternatively, the virtual agent (e.g., 138a) may be programmed on instantiation/startup by the virtual event manager 146 to directly populate the destination address of SNMP traps to the EAS 120. This may be effected by the virtual event manager 146 storing the address of the event aggregation manager 122 in the registry of the guest OS 140a during booting of the guest OS 140a.

Figure 3:
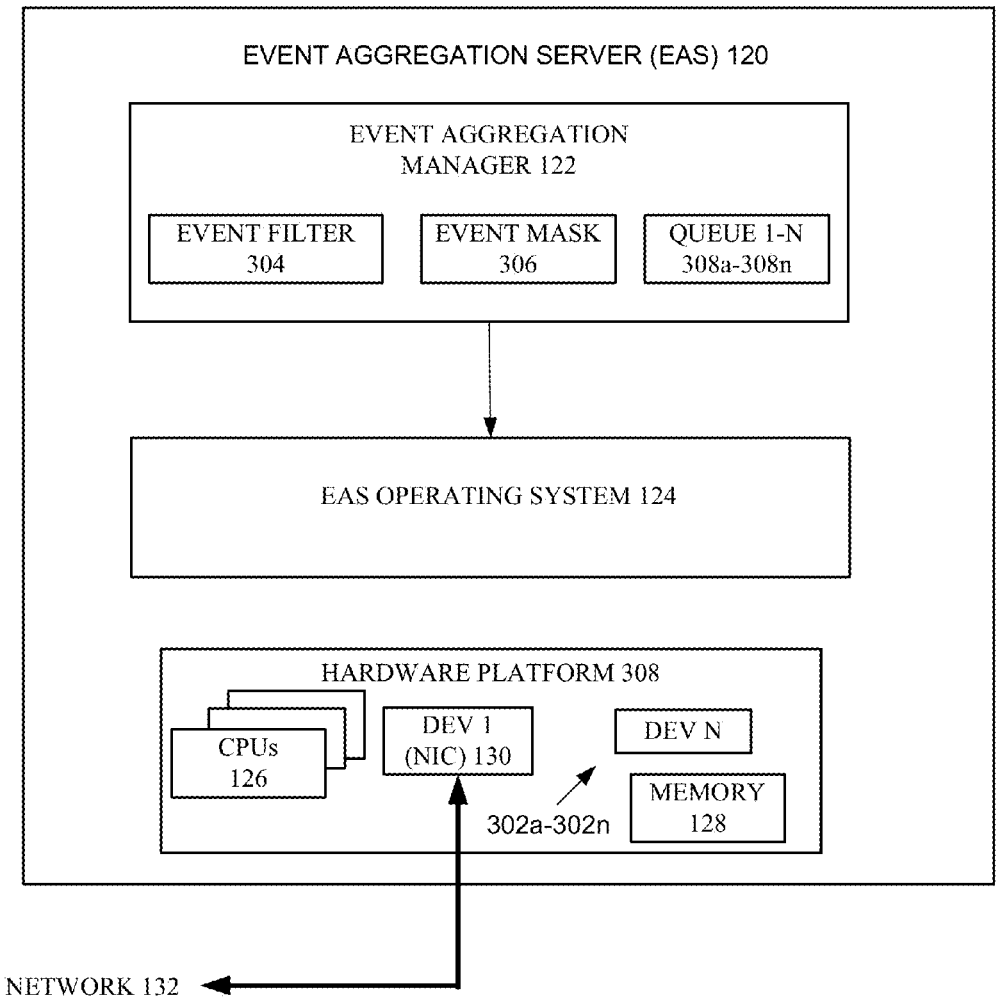
FIG. 3 is a block diagram illustrating one embodiment of the event aggregation server (EAS), configured to communicate with the one or more monitored servers and the network manager server (NMS) over a network, in which embodiments of the present disclosure may be implemented.

FIG. 3 is a block diagram illustrating one embodiment of the event aggregation server (EAS) 120, configured to communicate with the one or more monitored servers 134 and the network manager server (NMS) 106 over the network 132, in which embodiments of the present disclosure may be implemented. The EAS 120 may include a computing machine such as, for example, a server computer, a gateway computer, or any other suitable computer system that is configurable for operating as an EAS 120. The EAS 120 comprises an EAS operating system 124 and a hardware platform 308. The EAS operating system 124 may include Microsoft Windows®, Linux®, Solaris®, Mac® OS or any other suitable operating system for managing operations on the EAS 120.

The hardware platform 308 may include one or more central processing units (CPUs) 126, devices 302a-302n, and memory 128. The devices 302a-302n may be comprised of one or more hardware and software devices (DEV 1-DEV N), which may be located internally and externally to the EAS 120. An example of the devices 302a may include a network interface controller (NIC) 130 such as an Ethernet network card (e.g., device "DEV 1") for communication over the network 132. The network 132 may be a private network (e.g., a local area network (LAN), wide area network (WAN), intranet, etc.) or a public network (e.g., the Internet).

Other examples of the devices 302a-302n may include sound or video adaptors, photo/video cameras, printer devices, keyboards, displays, or any other suitable device intended to be coupled to a computer system. Examples of the memory 128 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, the EAS 120 may be configured to implement an event aggregation manager application 122. The event aggregation manager 122 may be configured to implement an event filter 304, an event mask 306, and one or more data stores (e.g., one or more queues 308a-308n (1-N)). In one embodiment, the event aggregation manager 122 may be configured to transmit a command (e.g., on system startup) to a virtual event manager 146 in the hypervisor 144 of a monitored server 134 to re-direct events from a virtual agent (e.g., 138a) of a virtual machine (e.g., 136a) to an address of the event aggregation manager 122 distinct from the address of the network manager 108 of a network management server (NMS) 106.

As a result, the event aggregation manager 122 is configured to receive events from the virtual agent (e.g., 138a) and store the event in one or more of the queues 308a-308n. In one embodiment, selection of a queue (e.g., 308a) for storing the event may be based on data associated with the event, e.g., its OID (i.e., event type) or its origin (e.g., the VM 136a-136n, the virtual CPU 210, or the VM devices 214a-214n).

In one embodiment, the event aggregation manager 122 may be programmed either on system startup or later by the administrator 102 from the administrator interface 104 over the network 132 from the NMS 106 to determine how to handle specific events, event types, event origins, or a combination of any of these characteristics. For example, if a virtual machine (e.g., 136a) generates an SNMP trap corresponding to an indication of low currently allocated virtual memory and an SNMP trap is generated indicating high usage of multiple virtual machines on one monitored server, then the event aggregation manager 122 may employ the event filter 304 to aggregate and correlate these events as a single event indicating to the NMS 106 that one or more virtual machines 138a-138n should be provided with more virtual memory or migrated to another monitored server.

In one embodiment, the event aggregation manager 122 may forward the event asynchronously to the network manager 108 of the NMS 106 or upon receiving a polling request from the network manager 108. Whether an event is passed on to the network manager 108 may be determined based on settings of the event filter 304 or the event mask 306. The event filter 304 or the event mask 306 settings may be programmed by the administrator 102 at the administrator interface 104. In response, the event aggregation manager 122 may receive registration requests from the network manager 108 to receive events based on at least one event characteristic listed above (e.g., event type, origin, etc.).

Figure 4:
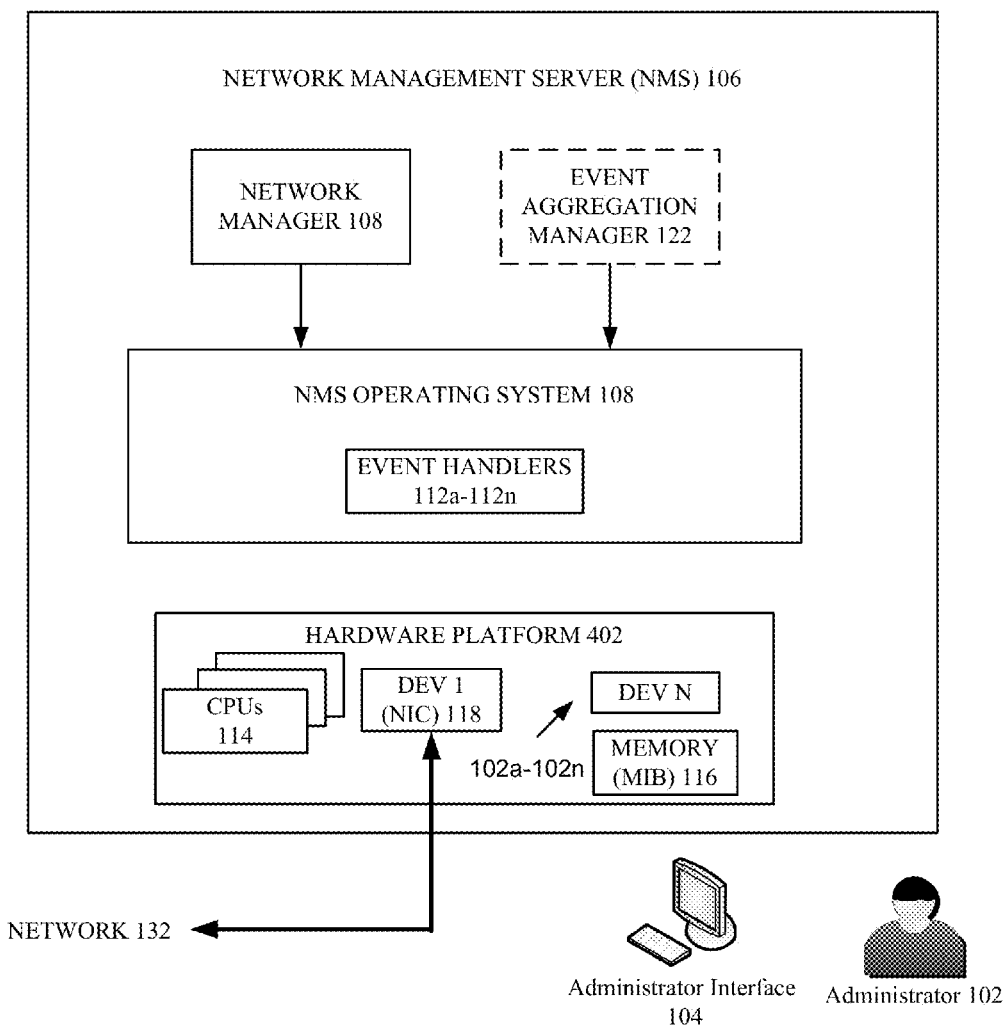
FIG. 4 is a block diagram illustrating one embodiment of the event management server (NMS), configured to communicate with the one or more monitored servers and the event aggregation server (EAS) over a network, in which embodiments of the present disclosure may be implemented.

FIG. 4 is a block diagram illustrating one embodiment of the event management server (NMS) 106, configured to communicate with the one or more monitored servers 134 and the event aggregation server (EAS) 120 over the network 132, in which embodiments of the present disclosure may be implemented. The NMS 106 may include a computing machine such as, for example, a server computer, a gateway computer, or any other suitable computer system that is configurable for operating as an NMS 106. The NMS 106 comprises an NMS operating system (OS) 108 and a hardware platform 402. The NMS operating system 108 may include Microsoft Windows®, Linux®, Solaris®, Mac® OS or any other suitable operating system for managing operations on the client NMS 106.

The hardware platform 402 may include one or more central processing units (CPUs) 114, devices 402a-402n, and memory 116. The devices 402a-402n may be comprised of one or more hardware and software devices (DEV 1-DEV N), which may be located internally and externally to the NMS 106. An example of the devices 402a may include a network interface controller (NIC) 118 such as an Ethernet network card (e.g., device "DEV 1") for communication over the network 132. The network 132 may be a private network (e.g., a local area network (LAN), wide area network (WAN), intranet, etc.) or a public network (e.g., the Internet).

Other examples of the devices 402a-402n may include sound or video adaptors, photo/video cameras, printer devices, keyboards, displays, or any other suitable device intended to be coupled to a computer system. Examples of the memory 116 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In one embodiment, the memory 416 may be configured to implement an SNMP or WMI system-wide management information base (MIB) (e.g., the number and identity of monitored hosts machines (e.g., the monitored server 134) and associated real devices (the CPU 148, the memory 150, the NIC 152, etc.), as well as the number and identity of associated virtual machines (e.g., VM 136a-136n) and virtual devices, residing on the monitored hosts.

In one embodiment, the EAS 120 may be configured to implement a network manager 108, and optionally, an event aggregation manager application 122 as discussed above. The EAS 120 may further implement one or more event handlers (drivers) 112a-112n in the NMS operating system 108. In one embodiment, the event aggregation manager 122 may be configured to program (e.g., on system startup) the event aggregation manager 122 to send a command to a virtual event manager 146 in the hypervisor 144 of a monitored server 134 to re-direct events from a virtual agent (e.g., 138a) of a virtual machine (e.g., 136a) to an address of the event aggregation manager 122 distinct from the address of the network manager 108 of a network management server (NMS) 106.

As a result, the network manager 108 may receive asynchronous, filtered, or masked events from the event aggregation manager 122 that originated from a virtual agent (e.g., 140a) of a VM (e.g., 136a) on a monitored server 134. The network manager 108 may register with the event aggregation manager 122 to receive events either asynchronously or in response to polling on a periodic basis.

In response to an event received from the event aggregation manager 122, the network manager 108 may invoke one or more of the event handlers 112a-112n based on one or more characteristics of the received event data (e.g., type, instance, origin, etc.). Information (data) associated with the event may be employed by the network manager 408 to gather information about the VM (e.g., 136a) that originated the event. This information/data may include, for example, a domain name (e.g., monitored server 134), state of the domain, CPU count defined for the domain, current allocated memory, a memory limit for the domain, CPU time, and row status. In a specific example, if a virtual machine (e.g., 136a) generates an SNMP trap corresponding to an indication of low currently allocated virtual memory, a corresponding trap handler may respond by increasing the amount of virtual memory for the VM 136a. In another example, if an SNMP trap is generated indicating high usage of virtual machines on one monitored server, then a corresponding trap handler may respond by automatically migrating one or more of the virtual machines to another monitored server having a smaller load.

Figure 5:
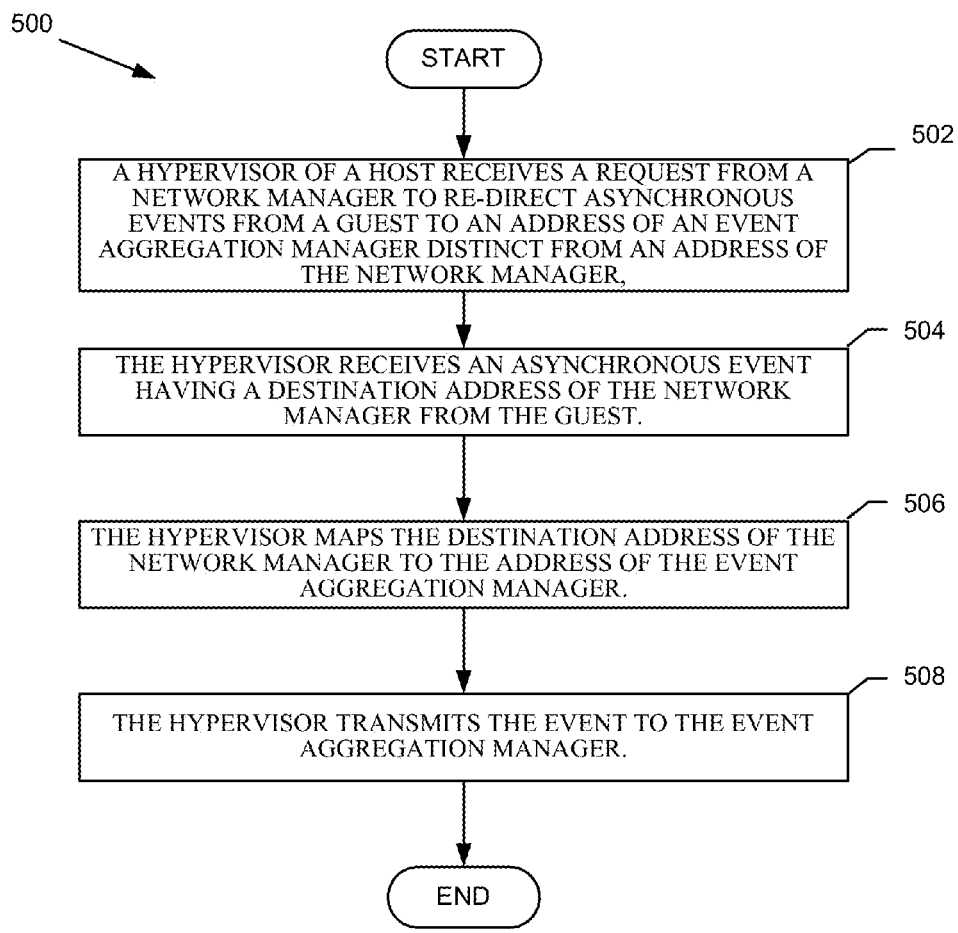
FIG. 5 is a flow diagram illustrating one embodiment of a method for integrating responses to asynchronous events performed by a hypervisor associated with at least one virtual machine located on the monitored server of FIGS. 1 and 2.

FIG. 5 is a flow diagram illustrating of one embodiment of a method 500 for integrating responses to asynchronous events. Method 500 may be performed by processing logic (e.g., in computer system 800 of FIG. 8) that may comprise hardware (e.g., circuitry, dedicated logic, programmable logic, microcode, etc.), software (such as instructions run on a processing device), firmware, or a combination thereof. In one embodiment, method 800 is performed by the hypervisor 142 of the monitored server 134 of FIGS. 1 and 2.

In one embodiment, method 500 begins when, at block 502, a hypervisor 142 of a monitored server 134 receives a request from a network manager 108 of a network management system (NMS) 106 to re-direct asynchronous events from a virtual machine (e.g., VM 136a) to an address of an event aggregation manager 122 distinct from an address of the network manager 108. The request includes the address of the event aggregation manager 122.

At block 504, the hypervisor 142 receives an asynchronous event having a destination address of the network manager 108 from a virtual machine (e.g., VM 136a). In one embodiment, the asynchronous event is received from a virtual agent (e.g., 138a) associated with the virtual machine (e.g., VM 136a). At block 506, the hypervisor 142 maps the destination address of the network manager 108 to the address of the event aggregation manager 122. At block 508, the hypervisor 142 transmits the event to the event aggregation manager 122. In one embodiment, mapping by the hypervisor 142 may comprise configuring the virtual machine (e.g., VM 136a) to directly re-direct events to the address of the event aggregation manager 142. The hypervisor 142 may effect this by storing the address of the event aggregation manager 142 in the registry of a guest OS 140a associated with the virtual machine 136a during booting of the virtual machine 136a.

The asynchronous event may be an SNMP trap or WMI trap.

In one embodiment, the address of the event aggregation manager 122 may be one of an ID, a URL, an IP address, or a MAC address.

Figure 6:
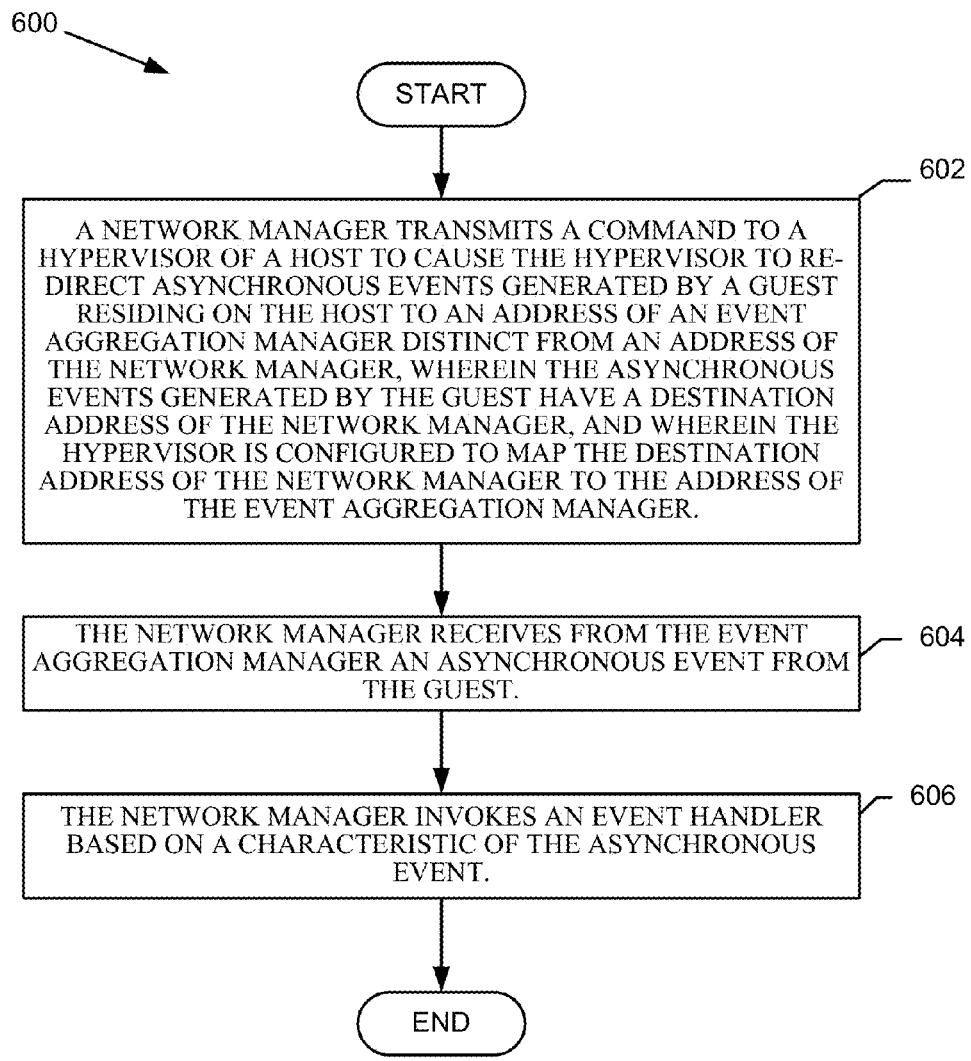
FIG. 6 is a flow diagram illustrating another embodiment of a method for integrating responses to asynchronous events performed by the network manager of the network management server (NMS) of FIGS. 1 and 3.

FIG. 6 is a flow diagram illustrating another embodiment of a method 600 for integrating responses to asynchronous events. Method 600 may be performed by processing logic (e.g., in computer system 800 of FIG. 8) that may comprise hardware (e.g., circuitry, dedicated logic, programmable logic, microcode, etc.), software (such as instructions run on a processing device), firmware, or a combination thereof. In one embodiment, method 600 is performed by the network manager 108 of the network management server (NMS) 106 of FIGS. 1 and 3.

In one embodiment, method 600 begins when, at block 602, the network manager 408 transmits a command to the hypervisor 142 of a monitored server 134 to re-direct asynchronous events from a virtual machine (e.g., 136a) to an address of an event aggregation manager 122 distinct from an address of the network manager 108.

The asynchronous events generated by the guest (e.g., 136a) have a destination address of the network manager 108. The hypervisor 142 is configured to map the destination address of the network manager 108 to the address of the event aggregation manager 122.

At block 604, the network manager 108 receives an asynchronous event from the event aggregation manager 122 that originated from the virtual machine (e.g., 136a). At block 606, the network manager 108 invokes an event handler based on at least one characteristic of the asynchronous event.

In one embodiment, the event handler may be invoked on a per-event basis or on a combination-of-events basis. In one embodiment, the at least one characteristic of the event may be event type, origin, event instance, etc., included in the data associated with the event. In one embodiment, the asynchronous event may be an SNMP trap or WMI trap. If the asynchronous event is an SNMP trap, the SNMP trap may be received from a corresponding virtual agent (e.g., 138a). The network manager 108 may gather information about the virtual machine (e.g., VM 136a) based on the received event. To continue the example above, if an SNMP trap is generated indicating high usage of virtual machines (e.g., VM 136a-136n) on one monitored server (e.g., 134), then a corresponding trap handler in the network manager 108 may send a GET message to the MIB of the monitored server 134 to query how many virtual machines are currently active on the monitored server 134 to determine whether one or more of the VMs 136a-136n may be migrated to another monitored server.

In one embodiment, the address of the network manager 108 may be one of an ID, a URL, an IP address, or a MAC address.

In one embodiment, the network manager 108 may register with the event aggregation manager 122 to receive events of at least one event characteristic or may poll the event aggregation manager 122 for events on a periodic basis.

Figure 7:
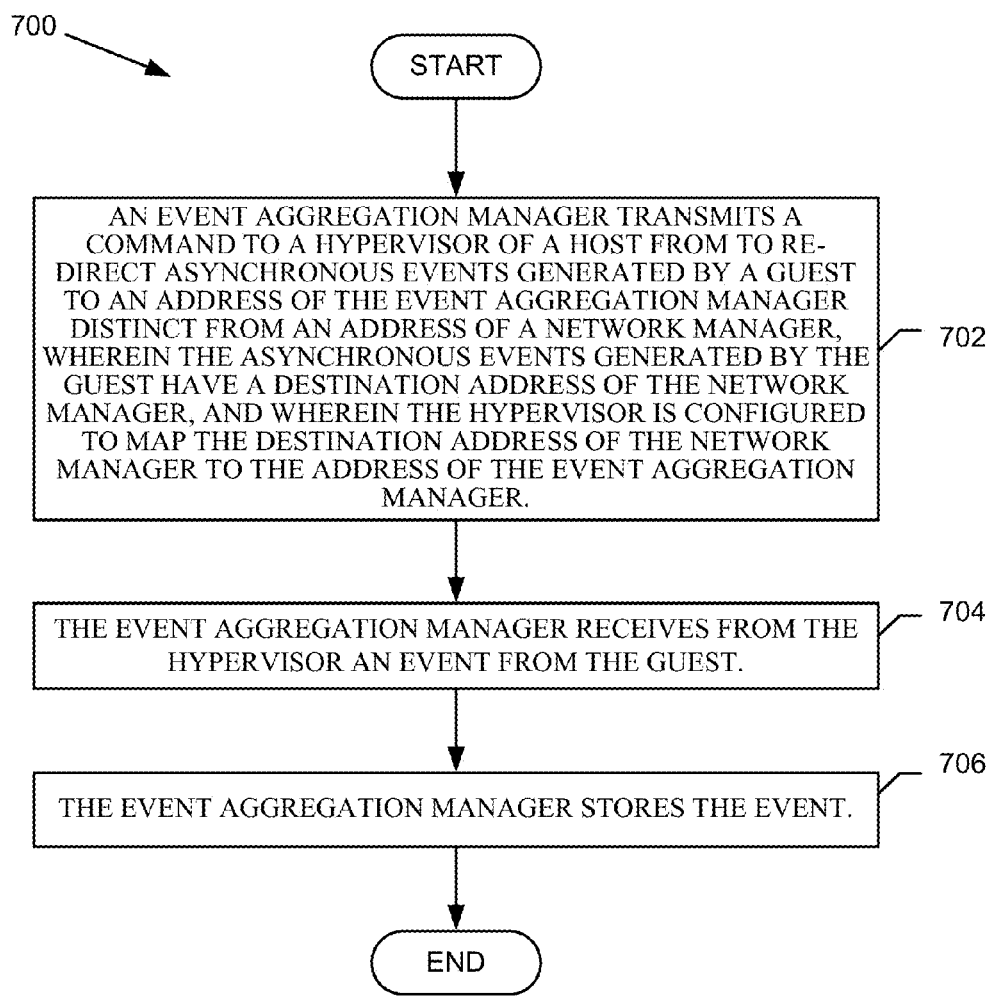
FIG. 7 is a flow diagram illustrating another embodiment of a method for integrating responses to asynchronous events performed by the event aggregation manager of the event aggregation server (EAS) of FIGS. 1 and 4.

FIG. 7 is a flow diagram illustrating of another embodiment of a method 700 for integrating responses to events. Method 700 may be performed by processing logic (e.g., in computer system 800 of FIG. 8) that may comprise hardware (e.g., circuitry, dedicated logic, programmable logic, microcode, etc.), software (such as instructions run on a processing device), firmware, or a combination thereof. In one embodiment, method 700 is performed by the event aggregation manager 122 of the event aggregation server (EAS) 120 of FIGS. 1 and 4.

In one embodiment, method 700 begins when, at block 702, the event aggregation manager 122 transmits a command to the hypervisor 142 of a monitored server 134 to re-direct asynchronous events from a virtual machine (e.g., 136a) to an address of an event aggregation manager 122 distinct from an address of the network manager 108. In another embodiment, block 702 may be performed instead by the network manager 408 of the network management server (NMS) 106.

At block 704, the event aggregation manager 122 receives an asynchronous event from the virtual machine (e.g., 136a).

The asynchronous events generated by the guest (e.g., 136*a*) have a destination address of the network manager 108. The hypervisor 142 is configured to map the destination address of the network manager 408 to the address of the event aggregation manager 122.

At block 706, the event aggregation manager 122 stores the asynchronous event in a memory (e.g., at least one of the queues 308*a*-308*n*). The selected queue 308*a*-308*n* may be based on a characteristic of the event, which may include, for example, the type of event, the origin of the event, the number of events of a type, other data associated with the event, or a combination of events.

In one embodiment, the event aggregation manager 122 may forward the asynchronous event asynchronously to the network manager 108. In another embodiment, event aggregation manager 122 may forward the asynchronous event to the network manager 108 in response to a polling request from the network manager 108.

In one embodiment, the received asynchronous event is configured to be masked and/or filtered by the event aggregation manager 122. This may be effected in response to a registration request from the network manager 108 to receive events having at least one characteristic. In one embodiment, the characteristic of the event may be the event type, origin, event instance, etc., or other data associated with the received event.

In one embodiment, the asynchronous event may be an SNMP trap or WMI trap. If the asynchronous event is an SNMP trap, the SNMP trap may be received from a corresponding virtual agent (e.g., 138*a*).

In one embodiment, the address of the event aggregation manager 122 may be one of an ID, a URL, an IP address, or a MAC address.

Figure 8:
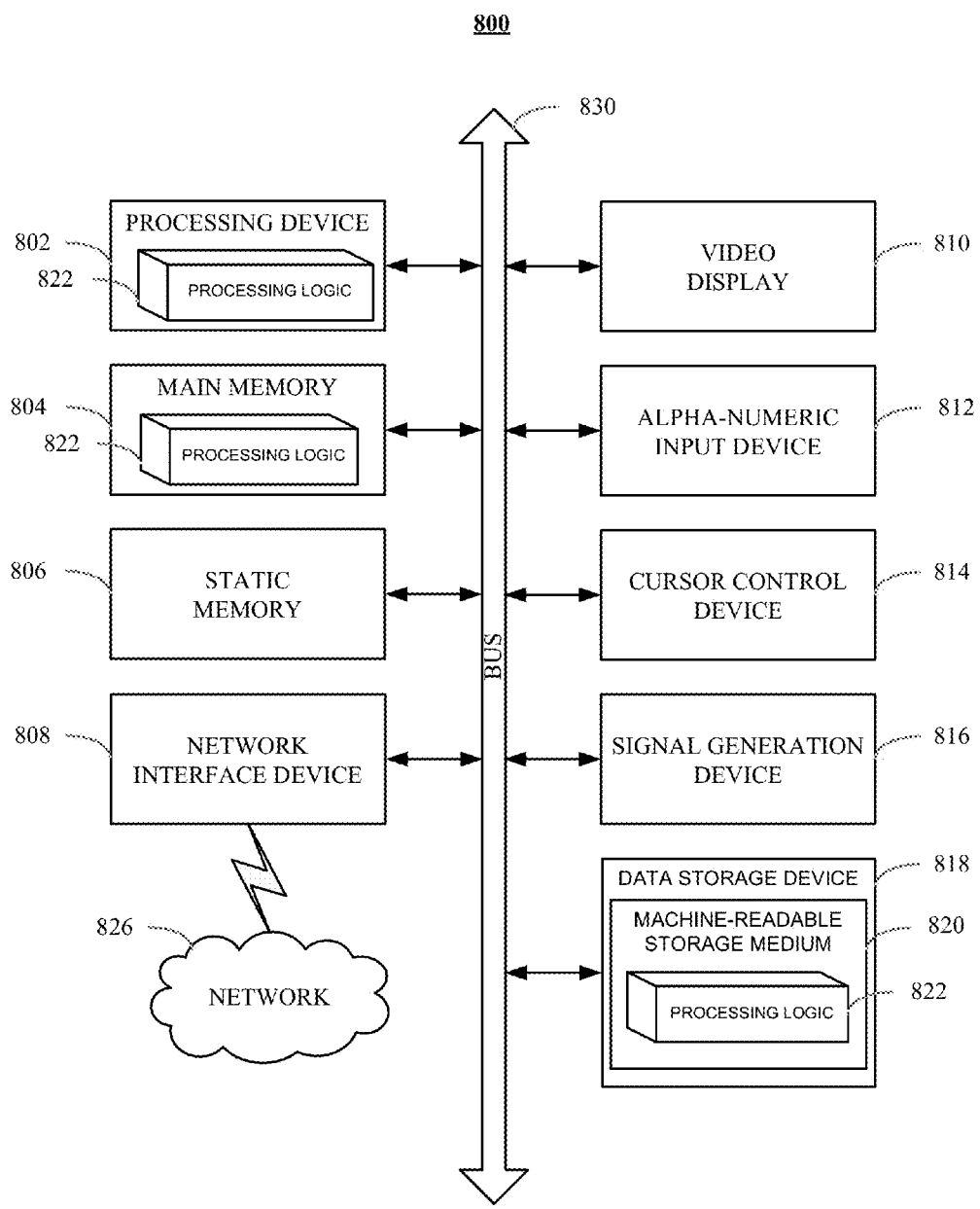
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic 822 for implementing at least one of the network management server 106, the event aggregation server 120, and the monitored server 134 for performing the operations and steps discussed herein.

Computer system 800 may further include a network interface device 808. Computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Data storage device 818 may include a machine-readable storage medium (or more specifically a computer-readable storage medium) 820 having one or more sets of instructions (i.e., processing logic 822) embodying any one or more of the methodologies of functions described herein. The processing logic 822 may also reside, completely or at least partially, within main memory 804 and/or within processing device 802 during execution thereof by computer system 800; main memory 804 and processing device 802 also constituting machine-readable storage media. The processing logic may further be transmitted or received over a network 826 via network interface device 808.

Machine-readable storage medium 820 may also be used to store the device queue manager logic persistently. While machine-readable storage medium 820 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    receiving a request, at a hypervisor of a host from a network manager, to re-direct events from a guest residing on the host to an event aggregation manager distinct from the network manager;
    receiving, at the hypervisor, an asynchronous event having a destination address of the network manager from the guest;
    mapping, by a processing device executing the hypervisor, the destination address of the network manager to an address of the event aggregation manager, wherein the mapping further comprises:
        configuring, by the hypervisor, the guest to directly re-direct the asynchronous event from the guest to the address of the event aggregation manager; and
    transmitting, from the hypervisor, the asynchronous event to the event aggregation manager.

2. The method of claim 1, further comprising storing, by the hypervisor, the address of the event aggregation manager in a registry of the guest during booting of the guest.

3. The method of claim 1, wherein the asynchronous event is an SNMP trap or a WMI trap.

4. The method of claim 3, wherein the SNMP trap is received from a virtual agent of the guest.

5. The method of claim 1, wherein the address of the event aggregation manager corresponds to an ID, a URL, an IP address, or a MAC address.

6. A method comprising:
    transmitting a command, from a network manager to a hypervisor of a host, to cause the hypervisor to re-direct events generated by a guest residing on the host to an event aggregation manager distinct from the network manager, wherein the events generated by the guest have a destination address of the network manager, and wherein the hypervisor is to map the destination address of the network manager to an address of the event aggregation manager and to configure the guest to directly re-direct the events from the guest to the address of the event aggregation manager;
    receiving, at the network manager from the event aggregation manager, an asynchronous event originated from the guest; and
    invoking, by a processing device executing the network manager, an event handler in view of a characteristic of the asynchronous event.

7. The method of claim 6, wherein the asynchronous event is an SNMP trap or a WMI trap.

8. The method of claim 6, wherein the address of the event aggregation manager corresponds to an ID, a URL, an IP address, or a MAC address.

9. The method of claim 6, wherein the event handler is invoked on a per-event basis.

10. The method of claim 6, wherein the event handler is invoked on a per-combination-of-events basis.

11. The method of claim 6, further comprising gathering information about the guest in view of data associated with the received asynchronous event.

12. The method of claim 6, wherein the network manager registers with the event aggregation manager to receive asynchronous events having the characteristic.

13. The method of claim 6, wherein the network manager polls the event aggregation manager for asynchronous events on a periodic basis.

14. The method of claim 6, wherein the received asynchronous event is to be masked at the event aggregation manager.

15. The method of claim 6, wherein the event aggregation manager is to receive a registration request from the network manager to receive the asynchronous event having the characteristic.

16. The method of claim 6, wherein the event aggregation manager is implemented in a server associated with the network manager.

17. The method of claim 6, wherein the event aggregation manager is implemented in a server distinct from a server associated with the network manager.

18. A system, comprising:
a memory;
a processing device, operatively coupled to the memory, to execute a hypervisor of a host to:
receive a request, from a network manager, to re-direct events from a guest residing on the host to an event aggregation manager distinct from the network manager;
receive an asynchronous event having a destination address of the network manager from the guest;
map the destination address of the network manager to an address of the event aggregation manager, wherein the processing device is further to configure the guest to directly re-direct the asynchronous event from the guest to the address of the event aggregation manager; and
transmit the asynchronous event to the event aggregation manager.

19. A non-transitory computer-readable storage medium including instructions that, when accessed by a processing device, cause the processing device to:
receive a request, from a network manager, to re-direct events from a guest to an event aggregation manager distinct from the network manager;
receive an asynchronous event having a destination address of the network manager from the guest;
map, by the processing device, the destination address of the network manager to an address of the event aggregation manager, wherein the processing device is further to configure the guest to re-direct the asynchronous event from the guest to the address of the event aggregation manager and to store the address of the event aggregation manager in a registry of the guest during booting of the guest; and
transmit the asynchronous event to the event aggregation manager.

* * * * *